Patented Apr. 13, 1954

2,675,413

UNITED STATES PATENT OFFICE 2,675,413

PRODUCTION OF UNSATURATED HALIDES BY EXCHANGE OF HALOGEN ATOMS

Seaver A. Ballard and Richard R. Whetstone, Orinda, Calif., assignors to Shell Development Company, Emeryville, Calif., a corporation of Delaware No Drawing. Application November 20, 1952, Serial No. 321,712

9 Claims. (Cl. 260—654)

This application is a continuation-in-part of our copending application, Serial No. 70,366, filed January 11, 1949, and now abandoned.

This invention pertains to an improved process for the production of unsaturated organic halides by exchange of atoms of dissimilar halogens. More particularly, the invention provides an improved process for the production of halogen-substituted olefins containing a bromine atom in the allylic arrangement from analogous chlorine-substituted olefins.

It is known that it is possible with various halogen-substituted organic compounds to replace a halogen atom by a dissimilar halogen. Such replacement, or exchange of dissimilar halogens, has been effected in certain cases by the action of free halogen or of a halogen hydride. With certain saturated organic compounds containing chlorine, such as chloroform or carbon tetrachloride, one or more chlorine atoms have been replaced by bromine atoms by the action of aluminum bromide.

Although it is known that in certain cases metal halides such as calcium bromide or calcium iodide can be employed to accomplish the exchange of halogen atoms in certain unsaturated organic compounds, no practical or commercially feasible method of accomplishing this reaction has heretofore been known. It heretofore was considered necessary to conduct the reaction in an anhydrous medium, apparently because of the likelihood that the unsaturated halides would undergo hydrolysis if water were present in the reaction system. Although the metal halide can be caused to react with the unsaturated halide under anhydrous conditions, the halo-substitution reaction is exceedingly slow, requiring from 20 to 40 hours. Furthermore, under such conditions the desired halo-substitution reaction is accompanied by numerous undesired side-reactions including the formation of tars and because of these side reactions the yield of the desired product is low and the reaction products are difficult to purify. When calcium bromide is employed as the metal halide and is used in the absence of water, the calcium bromide tends to form a hard solid cake in the reaction mixture, rendering adequate mixing of the reactants virtually impossible.

It now has been discovered in accordance with this invention that the replacement of halogen, especially chlorine, of such readily hydrolyzable unsaturated organic halides as the allyl-type halides, can be carried out in a vastly improved manner by heating the readily hydrolyzable, or allyl-type halides together with concentrated aqueous solutions of the alkali metal halides and of the alkaline earth metal halides. As the metal halides there are contemplated particularly the alkali metal bromides and the alkaline earth metal bromides. As the allyl-type halides there are contemplated particularly olefinically unsaturated halides containing at least one atom of chlorine having at least one atom of chlorine in the allyl arrangement. The process of the invention has the advantage of leading to a great reduction in the amount of by-products and to unexpectedly high yields of desired product. Furthermore, the necessary reaction times are desirably short. Of equal importance from the standpoint of large-scale application, manipulation of the reaction mixtures, e. g., stirring and transporting them, is greatly facilitated. With these advantages, there is obtained the further result that hydrolysis of the allyl-type halides is, despite the presence of water, substantially obviated.

The process of the present invention can be carried out simply by heating together at elevated temperature the allyl-type organic halide, which allyl type organic halide contains a chlorine atom in the allyl arrangement, and the concentrated aqueous solution of the alkali metal bromide or alkaline earth metal bromide. Temperature ranging from about room temperature up to about 200° C. may be employed. The temperatures above about 70° C. are preferred. The optimum temperature range has been indicated by the experimental data to be from about 70° C. to about 120° C., although excellent results, closely approaching those obtained within this optimum range still are obtained when temperatures as high as 140° C. are used. Although temperatures within these more limited temperature ranges have been mentioned as being particularly desirable for use in the process of the invention, it will be clearly understood that the invention is by no means limited thereto and that the process of the invention may be practiced over the broader ranges aforesaid with the advantages of the character hereinbefore indicated.

The degree of pressure under which the reaction is carried out is not critical. The process is a liquid-phase process, i. e., the allyl-type halide and the concentrated aqueous solution of the metal halide, are present both in liquid phase. The process conveniently can be carried out under atmospheric pressures, as by heating the reaction mixture at boiling in a vessel equipped with a reflux condenser open to the atmosphere. Where it is desired to employ higher temperatures than this would permit, superatmospheric pressures can be applied to the system or the reaction can be carried out in a closed vessel, such as an autoclave. The reaction mixture is but slightly acidic and leads to little if any corrosion of stainless steel or other corrosion-resistant metals. Such corrosion of the reaction vessel as otherwise might occur can be prevented by means of corrosion inhibitors, such as amine nitrites and the like, added to the reaction mixture.

The process of the invention leads to desirably high conversions of the applied reactants in an advantageously short reaction time. The exchange reaction between the allyl-type chloride and the concentrated aqueous solution of the alkali metal bromide or alkaline earth bromide has been indicated by the experimental data to involve an approach to an equilibrium which can be represented (using 1,3-dichloropropene and sodium bromide for purposes of illustration) by the following equation.

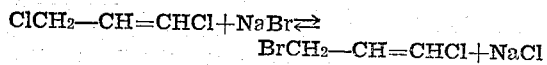

Equilibrium may be established at reaction times as short as 60 to 180 minutes, with conversion of as much as one-half or more of the applied reactants to desired product within this time. By reason of the rapid approach to equilibrium, the process of the invention is particularly well adapted to operation either as a batchwise operation or in a continuous or multistage procedure. Furthermore, since the organic halide resulting from the exchange reaction and the metal halide formed by the reaction are substantially the only products, the process is well adapted to recycling operations with minimal purification of the recycled materials being required.

The solution of the alkali metal bromide or alkaline earth metal bromide preferably is one which is at saturation with salt at the reaction temperature. In order to avoid hydrolysis of the allyl-type halide the solution should contain not less than about 50% of that amount of the metal halide required for saturation at the reaction temperature. When employing the saturated solutions, an amount of the metal bromide may be suspended or slurried in the saturated solution so as to maintain the solution substantially at saturation with metal halide throughout the reaction. Large excesses of metal halide, over and above the amount in solution, should be avoided in order that the reaction mixtures can be easily manipulated. The amount of the metal bromide thus may be from about 50% to 120% or more of the amount required for saturation of the water. When, as is preferred, sodium bromide is used as the metal bromide, sodium chloride, which is less soluble in water than is sodium bromide, may precipitate from solution as the reaction progresses. As is known, sodium bromide and sodium chloride crystallize together as a continuous series of solid solutions having compositions dependent, at constant temperatures, upon the concentrations in the mother liquor. There advantageously are used in the process of the invention saturated solutions of sodium bromide in water and the sodium bromide and water advantageously may be charged in weight ratios of sodium bromide to water between that of the saturated aqueous sodium bromide solution and about 5:1, preferably about 3:1.

The allyl-type halide and the alkali metal bromide or alkaline earth metal bromide can be employed in proportions relative to each other which can be varied within reasonable limits. The allyl-type halide and the metal bromide preferably are employed in initial proportions of from about 0.1 to about 10 equivalent weights of inorganic bromide (bromide ion) per mole of the allyl-type halide and most desirably from about 0.3 to 3 equivalent weights of inorganic halogen per equivalent of chlorine which is substituted in the allyl position in the allyl-type halide. Thus, where the allyl-type halide is allyl chloride and sodium bromide is the metal bromide, the allyl chloride and the concentrated aqueous sodium bromide solution (which may have sodium bromide suspended in it) preferably are charged in proportions corresponding to a mole ratio of allyl chloride to total NaBr between 10:1 and 1:10 and most desirably, between 3:1 to 1:3. Where, for example, the allyl-type halide is 1,4-dichlorobutene-2, the initial mole ratio preferably is between 10:2 and 1:20, most desirably between 3:2 and 1:6. With 1-chloro-4-bromobutene-2, 1,3-dichlorobutene-2, and 1,3-dichloropropene initial mole ratios equivalent to those employed for allyl chloride preferably would be used since each of these has but a single chlorine atom substituted in the molecule in the allyl position relative to the olefinic bond.

As stated hereinbefore, it is within the purview of the invention to carry out the process thereof in a batchwise or in an intermittent or semi-continuous manner or even in a fully continuous manner. For batchwise operations the process may be conducted as in a kettle equipped with reflux condenser at the boiling point of the reaction mixture, or there may be employed an autoclave or equivalent wherein the reaction mixture is heated under the pressure which develops autogenously at the reaction temperature or at higher pressure applied, for example, by introduction of inert gas. The same or equivalent equipment may be employed for semi-continuous operations. It is desirable, for obvious reasons of economy, to obtain the maximum practical conversion of the metal bromide. To this end there preferably is employed an intermittent, staged, or counter-current operation. In this operation, the charge of allyl-type halide having chlorine substituted in the allyl position may be contacted at reaction conditions initially with a concentrated aqueous solution or slurry comprising metal bromide and chloride, e. g., sodium bromide and sodium chloride, and resulting from a prior stage conducted in the manner to be described, then separated from the spent concentrated salt solution or slurry after completion of the reaction. The partially bromided allyl-type halide then may be contacted with fresh concentrated metal bromide solution. After completion of this second stage, the resulting partially spent salt solution, which ordinarily will be at saturation with respect to each of metal bromide and metal chloride, may be contacted with a fresh lot of the allyl-type halide which is to be bromided. One or more intervening stages, wherein partially spent salt solution and partially bromided allyl-type halide are contacted each with the other, rather than with fresh charge material, may be employed if desired. Indeed, in continuous operations it is feasible to employ a continuous counter-current flow wherein the concentrated metal bromide solution or slurry and allyl-type halide are introduced in counter-current flow through a plurality of contacting stages, each with associated separation means whereby organic phase and aqueous phase are separated and conveyed to the next respective stage. By recycling, staging, or counter-currently passing, in accordance with this preferred embodiment of the invention, partially bromided allyl-type halide and partially spent metal bromide solution each into contact with fresh or previously unreacted metal bromide solution and allyl-type halide, respectively, rather than by bringing the previously unreacted materials directly into contact with each other, conversions of the valuable metal bromide as high as 90% can be realized with substantially theoretical yields of bromided allyl-type halide.

The reaction of the allyl-type halide with the concentrated metal bromide solution preferably is carried out with vigorous agitation of the reaction mixture to ensure intimate contact of the immiscible liquid phases. Particularly good conversions have been obtained when the agitation was efficient enough that no individual droplets were visible to the naked eye. The interdispersion of the immiscible liquid phases can be facilitated if desired with the aid of small amounts of soap or other, non-ionic emulsifying agents, such as glyceryl monooleate, a polyethyleneoxide, or the like.

The following examples illustrate the invention. It will be understood that the examples are not to be misconstrued as limiting the invention as the same is defined by the appended claims since various specific embodiments of the invention can be practiced within the bounds of the claimed invention.

*Example I*

There were placed in a glass-lined vessel equipped with a water-cooled reflux condenser 795 grams (7.16 moles) of 1,3-dichloropropene and 1347 grams of an aqueous solution containing 738 grams (7.16 moles) of sodium bromide. The mixture was refluxed (kettle temperature about 95° C.) for 3.5 hours. The resulting mixture comprised about 906 grams of a water-immiscible organic phase, aqueous phase, and about 155 grams of precipitate, of which precipitate about 20% was sodium bromide and the remainder sodium chloride. The organic phase, the precipitate, and the aqueous phase were separated. By evaporation of the aqueous phase there was obtained 492 grams of salt, about 84% of which was sodium bromide. The organic phase was fractionally distilled. 1-chloro-3-bromo-1-propene was recovered in an amount corresponding to about 41% conversion of either reactant to product and a yield of 84%.

Instead of separating and evaporating the partially spent brine which is obtained in the foregoing example, the unconsumed sodium bromide can be converted to organic allyl-type bromide by employing the mixed salts in concentrated aqueous solution without separation of the sodium bromide and sodium chloride from each other. For example, the partially spent brine together with the precipitated salts can be used as is to bromide a further quantity of 1,3-dichloropropene. If desired, the sodium bromide and sodium chloride can be separated from each other by known methods, for example, with the aid of methanol.

Experiments performed in accordance with the invention have shown that the allyl-type halide reaches equilibrium with the substantially saturated solution of the metal bromide in accordance with the following equation

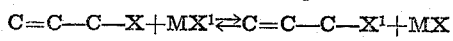

For rapid attainment of equilibrium, the presence of the water appears to be essential; the water apparently participates in the reaction in some manner. The highly concentrated, substantially saturated brines which are used also have been found to be essential for the advantages of the invention. With such substantially saturated brines the expected hydrolysis of the allyl-type halide is in some manner suppressed, with the result that an indeed surprisingly freedom from hydrolytic side reactions is realized.

With 1,3-dichloropropene the equilibrium indicated by the preceding equation is established with the formation, from equivalent portions based on the halogen atoms to be exchanged, of 40% of the halogen exchange product in from 2.5 to 3 hours and of 36% in 1.7 hours. By employing a threefold excess of either reactant, the conversion based on the deficient reactant is increased to 56% in from 2.5 to 3 hours and to about 50% in 1.7 hours.

The advantages of the method of this invention are apparent when it is realized that by employing 1 mole of anhydrous calcium bromide and 6 moles of 1,3-dichloropropene (a threefold excess of the organic halide based on the halogen atom to be exchanged) the conversion in 1.7 hours is only about 6%, and in 3 hours about 11%, with 48 hours being required to attain approximately 50% conversion.

Applicability of the process of the invention to multistage or continuous operation is shown by use of the dichloropropene recovered in Example I as the feed to a subsequent run in which comparable yield and conversion were obtained. By employing the partially spent brine from an experiment similar to that described in Example I, and in which the conversion and yield were 43% and 77%, respectively, there was obtained, upon replenishment of the sodium bromide and reaction with a further quantity of 1,3-dichloropropene, conversion to and yield of desired product equal to 33% and 72%, respectively.

*Example II*

A mixture of 222 grams (2.0 moles) of 1,3-dichloropropene and 260 grams of an aqueous solution containing 200 grams (1.0 mole) of calcium bromide was heated at boiling (about 103° C.) under reflux for 3 hours. The mixture then was permitted to stratify and the organic phase was separated and fractionally distilled. 1-chloro-3-bromo-1-popene was recovered in a conversion of 41%, based upon the 1,3-dichloropropene applied and in a yield of 82%.

*Example III*

A mixture of 165 grams (1.32 moles) of 1,4-dichloro-2-butene and 989 grams of an aqueous solution containing 544 grams (5.28 moles) of sodium bromide was heated at boiling (about 110° C.) under reflux for one hour. Upon separation of the organic phase and fractional distillation thereof there was obtained a mixture of 1-bromo-4-chloro-2-butene and 1,4-dibromo-2-butene distilling over the range 57° to 89° C. at 15 mm. Hg pressure.

Example IV

A mixture of 375 grams (3.0 moles) of mixed 1,3-dichloro-2-methylpropene and 2-chloromethyl-1-chloropropene (beta - chloromethylallyl chloride) and 1118 grams of an aqueous solution containing 618 grams (6.0 moles) of sodium bromide was heated at boiling (about 106° C.) under reflux for 4.5 hours. Upon distillation of the separated organic phase of the reaction mixture there was obtained a fraction (a) distilling at 99° to 107° C. at 150 mm. Hg pressure and composed of mixed chlorobromoisobutenes and a fraction (b) comprising 2-bromomethyl-1-bromopropene (beta-bromomethylallyl bromide). The conversion of the mixed dichloroiso-butylenes to fraction (a) was 39% while the conversion to fraction (b) was 8%.

Example V

There were mixed 258 grams of water and 309 grams of sodium bromide. When the water was saturated with sodium bromide 333 grams (3.0 moles) of 2,3-dichloro-1-propene were added and the mixture was heated under reflux (kettle temperature about 90° C.) for one hour. The organic phase was separated from the reaction mixture by stratification and decantation and then was distilled. There was recovered in good yield 2-chloro-3-bromo-1-propene having a boiling point of about 120° C.

As will be apparent from examples previously given herein, the allyl-type halides which are employed in the process of the invention may be used either in the form of substantially pure individual compounds or they may be used either in the form of mixtures of two or more allyl-type halides, each having a chlorine atom in the allyl position or of mixtures with other, non-allylic unsaturated halides, such as vinyl type halides, saturated halides, or olefinically unsaturated halides wherein the halogen atom or atoms are separated from the nearest olefinic carbon atom by more than one saturated carbon atom. Such mixtures of unsaturated or unsaturated and saturated halides may have been prepared by any known method, e. g., by mixing the previously prepared individual components, by treatment of alcohols including one or more allyl-type alcohols with phosphorus pentachloride, and by like methods. One of the important applications of the method of this invention resides in the conversion, to more valuable products, of mixed polyhalogenoolefins formed as high-boiling by-products during the substitutive chlorination of olefin hydrocarbons, such as propylene, according to the method of the Groll, Hearne, Bergin and La France patent, U. S. 2,130,084, issued September 13, 1938. These polychloro olefin hydrocarbons, which remain after separation of HCl, unconsumed olefin, and allyl-type mono-chlorides from the mixture formed by the substitutive halogenation, comprise di- and trichloro olefins of both the allyl and vinyl types and minor amounts of more highly chlorinated hydrocarbons. According to the invention, such mixtures may be treated by the method of the invention to replace by bromine substantially only that chlorine which is in the allyl position. This is illustrated in the following two examples:

Example VI

Propylene was substitutively chlorinated according to the method of the above-mentioned Groll and Hearne patent. By fractional distillation of the resulting mixture there was separated out a mixture of polychloropropenes distilling as follows: 3.5% over at 80° C.; 79.5% over at 80 to 120° C.; 17% boiling above 120° C. (all at 760 mm. Hg pressure). By infra-red spectral analysis the mixture had the following approximate composition (weight basis):

|  | Per cent |
|---|---|
| 1,3-dichloropropenes | 63.1 |
| 3,3-dichloropropene-1 | 3.5 |
| 2,3-dichloropropene-1 | 3.8 |
| 1,2-dichloropropane | 14.5 |
| More highly chlorinated hydrocarbons | 15.1 |

The chlorine content of the mixture was 60.5%. To a previously prepared mixture of 1136 grams of NaBr and 340 grams of water there were added 556 grams of the above mixture of chlorohydrocarbons and the mixture was heated 7½ hours at 95° C. At the end of this time, the organic phase was removed, dried over anhydrous sodium sulfate, and analyzed. It was found to contain 35% by weight bromine. On the basis that only the allylic chlorine atom of the 1,3-dichloropropenes would react, the theoretical bromine content of the product would be 36.1%.

Example VII

To a mixture of 2221 grams of sodium bromide and 1800 grams of water saturated with the sodium bromide there were added at about 70° C. 2000 grams of mixed polychloropropenes and higher-boiling chlorinated hydrocarbons. The mixture of chloro-substituted hydrocarbons had been prepared in the manner described in the preceding example and contained about 10.8 gram-moles of 1,3-dichloropropenes. The mixture of saturated aqueous sodium bromide solution and chlorine-substituted hydrocarbons was refluxed for 3 hours. The organic phase then was separated from the reaction mixture and treated again with fresh sodium bromide brine in the same manner, and this then was repeated a second time. The following results were obtained:

| Product of Cycle | $n_D^{20}$ | Chlorine, Percent | Bromine, Percent | Conversion, Percent |
|---|---|---|---|---|
| 1 | 1.485 | 40.9, 40.9 | 27.0, 26.4 | 72.6 |
| 2 | 1.493 | 36.5, 36.1 | 32.5, 32.5 | 92.0 |
| 3 | 1.494 | 34.5, 33.2 | 34.7, 34.7 | 99.5 |

The conversions were estimated from the bromine content of the organic products assuming the reaction to be, 1,3-dichloropropene→1-chloro-3-bromopropene

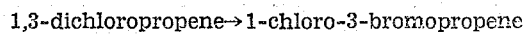

The final product, dried over sodium sulfate, weighed 2130 grams.

Example VIII

In order to investigate the effect of temperature a series of runs was carried out using the mixture of chlorinated hydrocarbons described in Example VI. Each run was carried out by charging to a Hastelloy autoclave 18 grams of water and 51 grams of sodium bromide and, after the water was saturated with sodium bromide, 185 grams of the mixture of chlorinated hydrocarbons. The autoclave then was closed and heated with stirring for 2 hours. The resulting oragnic product was separated from the mixture, dried, and analyzed. The following results were obtained:

| Temperature, °C. | Percent Conversion of NaBr | Bromine Content of Organic Product, Percent by weight |
|---|---|---|
| 100 | 53 | 10.5 |
| 110 | 84 | 17.1 |
| 120 | 86 | 17.7 |
| 130 | 83 | 18.3 |
| 140 | 83 | 17.4 |

Example IX

It has been stated herein that the process of the invention can be carried out by intermittent or continuous multistage operations, and one form of such a procedure has been illustrated in Example VII. The present example illustrates a full staged operation with countercurrent progression of the metal halide brine and chlorinated hydrocarbons used as starting materials through the successive stages of the process. The procedure illustrated by this example has the dual advantage of leading to high conversion of the relatively valuable metal bromide and to high bromine content of the chlorobromohydrocarbon obtained as product. The series of runs, which can be continued indefinitely, was carried out in a Hastelloy autoclave. After the initial or start-up run there were alternately charged to the autoclave sodium bromide brine (NaBr/H2O weight ratio 2.8) and a mixture of chlorinated hydrocarbons similar to the mixture described in Example VI except that the mixture had been flash distilled to remove high-boiling residues. Each respective time, 1.07 mole of NaBr and 1.0 mole of the chlorinated hydrocarbons, based upon the content of 1,3-dichloropropenes, was charged. After each respective addition the autoclave was closed and heated with vigorous stirring for two hours at 120° C. The contents then were allowed to stratify and the phase (aqueous or organic) corresponding to the material next to be added was withdrawn. The following table describes the over-all run and the results obtained.

| Step No. | Material(s) Charged | Mole Ratio NaBr to 1-3-dichloropropene | Bromine Content of Organic Phase after 2 hours reaction at 120° C | Material Withdrawn |
|---|---|---|---|---|
| 1 | saturated NaBr brine and chlorinated hydrocarbons | 1.07 | 27.5 | organic phase. |
| 2 | chlorinated hydrocarbons | 0.3 | 12 | spent brine (to discard). |
| 3 | NaBr brine | 1.4 | 31 | organic phase (desired chlorobromohydrocarbons). |
| 4 | chlorinated hydrocarbons | 0.4 | 16 | spent brine (to discard). |
| n[a] | NaBr brine | | 33 | organic phase (desired chlorobromohydrocarbons). |
| n+1 | chlorinated hydrocarbons | | | spent brine (to discard). |
| cumulative ratio | | 1.07 | | |

[a] n=any large number.

The last entry in the table shows the bromine content of the product that is obtained upon continuous operation according to the foregoing schedule. Under the conditions of this series, an about 86% conversion of sodium bromide to organic bromides is obtained in such continuous operations. The product of the first or start-up step naturally represents but a very small amount of the total organic product of such continuous operations. This initial product can be reintroduced into the process, for example, in small amounts with the feed to subsequent steps, if its bromine content is not as high as is desired.

Example X

Where a mixture of chlorinated hydrocarbons, such as those used in some of the preceding examples, is employed and it is desired to obtain a product having a higher content of bromine than it is feasible to obtain by a single bromiding treatment, the methods illustrated in Example VII or IX may be used. It also is feasible, by reason of the selectivity with which the allylic chlorine in the allyl position is replaced, to separate the bromine-containing organic compounds from residual non-allylic halides which may have been present in the feed, as by distillation of the organic product. For example, a product, containing 17.9% by weight of bromine, was prepared by treatment of a sample of the mixture of polychlorohydrocarbons described in Example VI with a saturated aqueous NaBr brine at about 120° C. for 2 hours. This product was fractionally distilled while keeping the kettle temperature below about 130° C. by reduction of the pressure. The following fractions were collected.

| Boiling Range | Bromine Content, percent w. | Percent w. of Charge | Percent w. of total Br. |
|---|---|---|---|
| Start to 75° C./200 mm. Hg | 5.0 | 42.2 | 11.8 |
| 75° C./200 mm. Hg to end | 29.0 | 35.0 | 89.6 |
| Original material | 17.9 | 100 | 100 |

Thus, by simple fractionation, substantially 90% of the bromine in the original material was concentrated in slightly more than half the weight of the original charge and the bromine content was increased from about 18% to almost 30%.

For maximum stability of the bromo-substituted hydrocarbons, as for storage or transportation, it is desirable that they be freed as completely as possible of any traces of the brine with which they were in contact during the process. The products may be dehydrated by known techniques. A preferred method is to contact the product, after separation as a water-immiscible organic phase from the reaction mixture, with a desiccant, such as a solid anhydrous salt. Calcium chloride, sodium sulfate, and the like may be used.

The product preferably may be percolated through a bed of the solid granular desiccant, although other means of contacting the two materials may, of course, be employed.

The method of the present invention can be used to replace by bromine the chlorine atom or atoms in the allyl position of any halogen-substituted olefinically unsaturated hydrocarbon containing one or more atoms of chlorine in the allyl position. By the term allyl position reference is made to the position of substitution, which position is located on a saturated carbon atom that is directly attached to an olefinically unsaturated carbon atom. The allylic arrangement is the arrangement of substituents characterized by substitution in the allyl position. The term allyl-type hydrocarbon halide refers to an olefinically unsaturated hydrocarbon which is substituted at least in the allyl position by halogen. The term allyl-type hydrocarbon chloride refers to an allyl-type hydrocarbon halide having chlorine in at least the allyl position. Illustrative allyl-type hydrocarbon chlorides which can be employed in the process of the invention include, among others, 1,3-dichloropropene, 1,3-dichloro-2-methylpropene, 1-chloro-2-chloromethyl-2-propene, 1-phenyl-3-chloro-1-propene, 3-chloro-1-decene, 1,2,3-trichloropropene, 1,4-dichloro-2-butene, 3-chloro-1-bromo-1-propene, 1-chloro-4-bromo-2-butene, 1-chloro-5,6-dibromo-2-hexene, 1,3,3,-trichloro-1-propene, 1-iodo-3-chloropropene, 1-chloro-2,4-pentadiene, 3-chloro-1,4-pentadiene, 1-chloro-4-cyclopentyl-2-butene, 3-chloro-1-chlorophenyl-1-propene, 1,6-dichloro-2-hexene, and 1-chloro-2-cyclohexene. There is no known upper limit to the molecular size of the allyl-type hydrocarbon chloride, although the process ordinarily will be employed for replacing, by bromine, the allyl chlorine of allyl type hydrocarbon halides containing from 3 to 10 carbon atoms.

Metal bromides which can be employed equivalently to those shown in the examples are the bromides of the alkali metals and of the alkaline earth metals, i. e., lithium, sodium, potassium, rubidium, cesium, magnesium, calcium, strontium, barium, etc. The metal halides can be employed as individual compounds or as mixtures of two or more.

It will be understood that numerous specific embodiments of the invention can be practiced without departure from the letter and spirit of our claims.

We claim as our invention:

1. In the method of producing 1-chloro-3-bromo-1-propene by contacting 1,3-dichloropropene with a metal bromide, the improvement which comprises heating a mixture of 1,3-dichloropropene and an amount of a substantially saturated aqueous solution of sodium bromide containing substantially one equivalent weight of bromine for each mole of organic halide, at the reflux temperature of the mixture.

2. In the method of producing β-bromomethylallyl bromide by contacting β-chloromethylallyl chloride with a metal bromide, the improvement which comprises heating a mixture of β-chloromethylallyl chloride and an amount of a substantially saturated aqueous solution of calcium bromide containing substantially two equivalent weights of bromine for each mole of organic halide at the reflux temperature of the mixture.

3. In a process for the production of organic bromides by contacting with a metal bromide a dichloroalkene containing at least one chlorine atom in the allylic arrangement, the improvement which comprises heating the organic halide in contact with an amount of a substantially saturated aqueous solution of a metal bromide of the group consisting of the alkali and alkaline earth metal bromides, said solution containing from 0.1 to 10 equivalent weights of bromine for each mole of organic halide, at a temperature of from about 40° C. to 120° C., whereby at least the aforesaid chlorine atom in the allylic arrangement is replaced by a bromine atom.

4. In a process for the production of an organic bromide by contacting with a metal bromide an aliphatic monoolefin containing at least one chlorine atom in the allylic arrangement, the improvement which comprises heating the organic halide in contact with an aqueous mixture containing from 50 to 120% of the soluble amount of a metal bromide of the group consisting of the alkali metal and the alkaline earth metal bromides, said solution containing from 0.1 to 10 equivalent weights of bromine for each mole of organic halide, at a temperature of from about 40° C. to 120° C., whereby at least the aforesaid atom in the allylic arrangement is replaced by a bromine atom.

5. In a process for the production of 1-chloro-3-bromo-1-propene by contacting 1,3-dichloropropene with a metal bromide, the improvement which comprises heating 1,3-dichloropropene and a substantially saturated aqueous solution of sodium bromide together at an elevated temperature not over about 200° C., the amount of sodium bromide being from about 0.1 to about 10 moles per mole of the 1,3-dichloropropene.

6. A process for the production of a valuable mixture of halogen-substituted unsaturated hydrocarbons containing both bromine and chlorine substituents which comprises heating a mixture comprising predominantly polychloro-substituted olefins which, in turn, predominate in 1,3-dichloropropenes, with a slurry of sodium bromide in a saturated aqueous solution of sodium bromide, the equivalent ratio of sodium bromide to the allyl chlorine of said mixture being from about 0.1 to about 10, at a temperature from about 70° C. to about 200° C. and then separating the organic and aqueous phases of the reaction mixture from each other.

7. The staged countercurrent process for the production of a bromo-hydrocarbon which comprises reacting with each other in a plurality of successive contacting stages and in countercurrent progression through the series of successive contacting stages, a substantially saturated aqueous solution of a metal bromide of the group consisting of alkali metal bromides and alkaline earth metal bromides and a halogen-substituted olefin hydrocarbon having at least one atom of chlorine in the allyl arrangement, the ratio of the total number of equivalents of said metal halide to the total amount of said chlorine in the allyl arrangement being between about 1:10 and about 10:1 and the reaction being conducted at an elevated temperature not over about 200° C.

8. The staged countercurrent process for the production of valuable chlorobromohydrocarbons which comprises reacting with each other in a plurality of successive contacting stages and in countercurrent progression through the series of successive contacting stages, a slurry initially of sodium bromide in saturated aqueous sodium bromide brine and a mixture of chlorinated hydrocarbons comprising polychlorinated propene and predominating in 1,3-dichloropropene, the mole ratio of the total amount of sodium bromide to the total amount of 1,3-dichloropropenes being between about 10:1 and about 1:10 and the reaction being conducted at a temperature of from about 70° C. to about 140° C.

9. In a process for the production of an organic bromide by contacting a halogen-substituted olefin hydrocarbon having at least one atom of chlorine in the allyl arrangement with a metal bromide, the improvement which comprises heating the halogen-substituted olefin hydrocarbon in contact with a concentrated aqueous solution containing not less than 50% of the soluble amount of a metal bromide of the group consisting of the alkali metal and alkaline earth metal bromides, the equivalent ratio between said halogen-substituted olefin hydrocarbon and said metal bromide being between about 10:1 and 1:10, at an elevated temperature not over about 200° C., whereby at least the aforesaid atom in the allylic arrangement is replaced by bromine.

References Cited in the file of this patent

Conant et al., "Jour. Am. Chem. Soc.," vol. 47, pages 488–550 (1925).

Young et al., "Jour. Am. Chem. Soc.," vol. 58, pages 1157–62 (1936).

Bither et al., "Jour. Am. Chem. Soc.," vol. 67, pages 1562–6 (1945.)